UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF AMMONIA.

1,158,167.     Specification of Letters Patent.     Patented Oct. 26, 1915.

No Drawing.     Application filed November 18, 1911. Serial No. 661,013.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in the Production of Ammonia, of which the following is a specification.

Haber and Le Rossignol describe the catalytic production of ammonia from its elements using iron as a catalytic agent. They start from the purest commercial iron oxid and either reduce this with hydrogen at a very high temperature, namely at 1,000° C. (*Berichte* 1907, 2147), or pass the mixture of nitrogen and hydrogen directly over it at 900° C. (*Zeitschrift für Elektrochemie* 1908, 190). The yields of ammonia obtained using the purest iron obtainable in this manner are extremely small. We have now made the surprising observation that the pure iron possesses a considerably better action, that is to say, a considerable acceleration in the formation of ammonia is secured already at comparatively low temperatures lying considerably below 900° C., if the pure iron intended for the catalyst is produced from the oxid or other compound at relatively low temperatures, preferably not exceeding 600° C., and care is taken that during the catalysis it be not heated above this temperature. The reduction is carried out preferably by means of hydrogen, but it can also be brought about in any other manner, for instance with ammonia, in which case the pure iron is obtained in the form of a nitrid. In this invention pure iron nitrid is equivalent to pure iron. If desired, however, the pure ferric oxid, ferroso-ferric oxid, etc., can be introduced into the contact space and the gas mixture be passed over it from the start below the aforementioned temperature.

Now what we claim is:—

1. The process of producing ammonia catalytically by passing a mixture of nitrogen and hydrogen over pure iron prepared from a compound thereof at a temperature not exceeding about 600° C.

2. The process of producing ammonia catalytically by passing a mixture of nitrogen and hydrogen over pure oxid of iron at a temperature not exceeding about 600° C., and then continuing passing the nitrogen and hydrogen also at a temperature not exceeding about 600° C. after the iron has been reduced to the metallic state.

In testimony whereof we have hereunto set our hands in the presence of two subscribing witnesses.

CARL BOSCH.
           ALWIN MITTASCH.

Witnesses:
   J. ALEC. LLOYD,
   A. O. TITTMANN.